United States Patent [19]

Chiarito

[11] Patent Number: 4,533,475
[45] Date of Patent: Aug. 6, 1985

[54] METHOD AND APPARATUS FOR FLUID FILTRATION INCLUDING PARTICLE PRECIPITATION

[75] Inventor: Richard J. Chiarito, Corona, Calif.

[73] Assignee: U.M.E., Incorporated, Calif.

[21] Appl. No.: 556,884

[22] Filed: Dec. 1, 1983

[51] Int. Cl.$^3$ .............................................. B01D 21/26
[52] U.S. Cl. ..................... 210/788; 210/806; 210/807; 210/261; 210/262; 210/304; 210/305; 210/512.1; 55/98; 55/315; 55/337; 55/459 R
[58] Field of Search ............... 209/144, 211; 210/787, 210/788, 800, 801, 802, 804, 806, 261, 262, 265, 304, 305, 320, 322, 332, 512.1; 55/98, 315, 325, 337, 459 R

[56] References Cited

U.S. PATENT DOCUMENTS

| | | | |
|---|---|---|---|
| 631,571 | 8/1899 | Hayden | 210/304 |
| 955,787 | 4/1910 | Freeman | 210/304 |
| 1,400,622 | 12/1921 | Nordell | 210/788 |
| 3,196,141 | 7/1965 | Bradford | 210/800 |
| 3,285,422 | 11/1966 | Wiley | 209/211 |
| 3,325,014 | 6/1967 | Williamson | 210/320 |
| 3,770,623 | 11/1973 | Seidel | 210/800 |
| 4,178,252 | 12/1979 | Krone | 210/521 |
| 4,263,029 | 4/1981 | George | 55/459 R X |
| 4,297,221 | 10/1981 | Moll et al. | 210/512.1 |

Primary Examiner—Richard V. Fisher
Assistant Examiner—W. Gary Jones
Attorney, Agent, or Firm—Knobbe, Martens, Olson & Bear

[57] ABSTRACT

A particle precipitator in the form of a cylindrical tank accepts raw water through a tangentially and horizontally mounted pipe. The precipitator is divided into three separate chambers, a lower, middle, and upper chamber separated by two baffles. The raw water enters and circulates into the lower chamber and because the lower chamber is of much larger volume than the inlet pipe, the velocity of the raw water is substantially reduced. During the raw water's residence time in the lower chamber, many of the larger particles are permitted to precipitate out to the bottom of the precipitator tank. The water then flows through a center opening of the lower baffle to the middle chamber and around the outer edges of the upper baffle to the upper chamber. By the time the water reaches the upper chamber, most of the larger particles have had a chance to precipitate out and the water in this upper chamber is substantially cleaner than it was when it entered the precipitator tank. The water from the upper portion of the tank is drawn off through a pipe which is centrally mounted within the cylindrical precipitator tank. For some applications, the water directly from the precipitator may be used. However, generally the precipitator will be the primary filter of a filtration system. The filter next in line will be the secondary filter and can be any of a wide variety of finer filters including a media filter or a screen filter.

18 Claims, 4 Drawing Figures

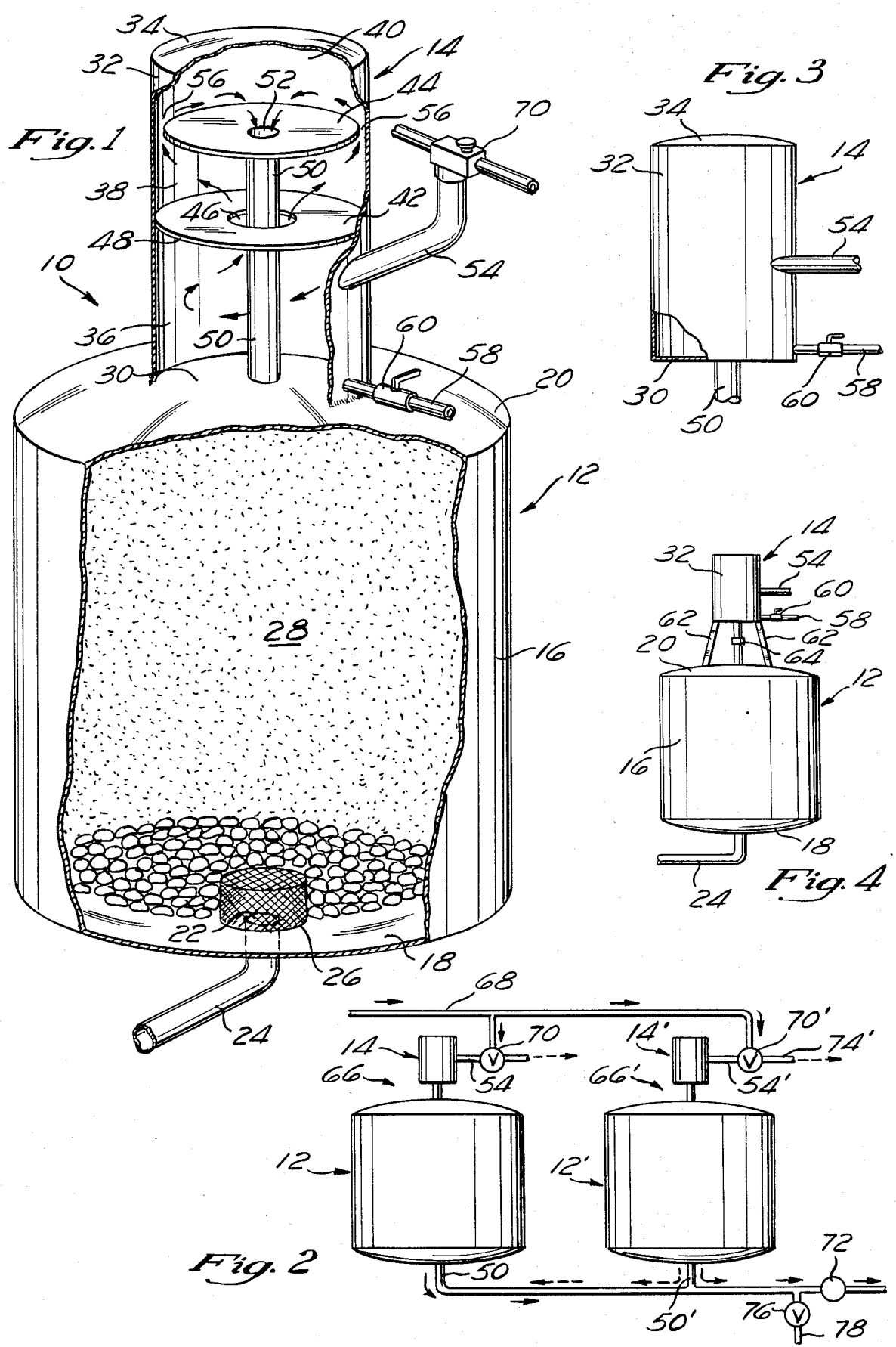

METHOD AND APPARATUS FOR FLUID FILTRATION INCLUDING PARTICLE PRECIPITATION

BACKGROUND OF THE INVENTION

This invention relates to the field of water filtration and in particular to a particle precipitator intended for use alone or in combination with other filters including sand and screen filters.

Fluid filtration including particle separation is desirable for a wide variety of purposes. For example, where irrigation water is scarce, particularly in more arid areas, a farmer is likely to look to almost any source of raw water, no matter how dirty to keep his fields irrigated and crops prosperous. It is axiomatic however, that any particles in the farmer's irrigation water can cause severe problems. These problems include clogging of the conduits and spraying devices as well as the eventual undesirable filling in of naturally aerated soil with fine particles that can ruin the productivity of the soil. Other uses for filtration systems include sewage treatment and water purification.

Over the years, a large number of fluid filtration systems have been developed to meet the wide variety of needs alluded to above. One well known filter especially useful for the filtration of raw water to be used for irrigation is a media filter. Although media filters come in all shapes and sizes, a good example of a basic media filter comprises an upstanding cylindrical tank having an opening in the top for accepting raw water and a discharge port at the bottom for discharging filtered water. The port at the bottom of the tank generally will have a collector screen to prevent the filter media from escaping. The filter media itself can be a variety of materials but normally will be a layer of gravel at the bottom covered by a layer of finer sand which will fill most of the cylindrical tank.

Another type of filter that is in common use is a screen filter. Screen filters generally will consist of a cylindrical tank with a concentric cylindrical screen inside the tank and extending along the length thereof. Raw water is pumped into the middle of the screen and exits the tank from the outside portion of the screen.

As particles clog the pores of the screen and media filters, these filters become less efficient and eventually the flow rate becomes untolerably low. At this point these filters must be back washed to get rid of the silt and particles that have clogged up the filter pores. It is obvious that the longer the period that a filter lasts between back washes, the better. As both the screen and the media filters are designed to filter out fairly fine particles it can be seen that if the raw water being filtered has a large number of reasonably large sized particles, these filters will become clogged quickly and will require back washing at very short intervals. One solution to this problem is to provide some sort of separator to remove the larger particles before they reach the screen or media filter.

In the case of the media filter, the applicant is aware of at least one firm that provides a particle separator to accept the raw water before it reaches the media filter. The separator is a dumb-bell shaped container which is mounted at an angle to the ground of about 40° to 47°. Raw water is introduced at the upper dumb-bell portion tangentially to the interior surface of the container and at a high velocity. This causes the water within the container to rotate at a fairly high speed forcing heavier particles to the surface of the container and eventually to the bottom portion thereof. A pipe is placed in the center of the whirling water about half or three-quarters of the way down through the container from the top. This pipe siphons off the cleaner water from the middle and directs it to the next stage filter which can, for example, be a media filter. Some of the drawbacks of this system are that it takes up a substantial amount of space and it requires a high velocity and thus high pressure operation which is expensive to provide.

Another particle separator known to the applicant comprises a rectangular elongated closed box which has baffles along the bottom and/or top surface. Water flows from one side of the box to the other side of the box through the path created by the baffles. The baffles act to slow down the flow and thus permit particles to separate out and fall to the bottom of the box.

Another separator known to the applicant involves an elongated rectangular box having no baffles in it and tilted at an angle of about 47°. The water enters the box at the lower end thereof and is in theory designed to flow at a rate such that the fluid flow is laminar from the bottom to the exit at the top of the box. During the period that the fluid is within the box, particles precipitate out and fall eventually to the bottom portion of the box.

A sedimentation tank similar to the one discussed above in connection with the baffles in the rectangular box is shown in a U.S. patent issued to D. E. Bradford on July 20, 1965 having U.S. Pat. No. 3,196,141 and entitled "Recovery of Solids From a Liquid-Solid Slurry". The chemical slurry is introduced at one end of a tank 2 which contains a series of internal baffles 18. The baffles aid sedimentation by slowing down the flow of the fluid. Such tanks are fairly expensive to build and have substantial space requirements.

The U.S. patent issued to K. Seidel on Nov. 6, 1973, having U.S. Pat. No. 3,770,623, and entitled "System for Purification of Polluted Water" shows a combination of a settling tank 11 and a series of filtration beds 13. The settling tank is square and has a series of internal baffles 20 to slow down the flow of water. The settling tank is intended to collect the most coarse sediment 10 (see FIG. 4) before the fluid flows into the filtration beds. The invention is directed to incorporating plants in the filtration process to obtain a better purification effect. It is clear that the disclosed filtration system is rather bulky and requires a large commitment in space as well as a substantial amount of maintenance to make the system operate properly.

A United States patent issued to Krone on Dec. 11, 1979, having U.S. Pat. No. 4,178,252 and entitled "Device for Separating Particles From a Fluid Suspension and Method For Doing So" shows a cylindrical sedimentation tank in FIGS. 2 and 3. Raw water is introduced into the tank by tubes 48 and 49 which extend into the annular space between the wall 42 of the cylindrical tank and the inner concentric cylindrical baffle 45. The water goes up through the annular space between the baffle 45 and the wall of the tank 42 out into the main part of the tank and then down through weir 52 into pipe 53. The heavy particles are intended to precipitate to the bottom and light ones to rise to the top of the surface of the water between the point when the water leaves the top of the annular space between baffle 45 and wall 42 and time when it reaches weir 52. The theory of the patent is that by providing a rotating cylindrical wall in the annular space between baffle 45 and wall 42, shear forces will be created which will act to help somehow in separating particles from the water. Because the raw water emerges from the narrow annular space created between baffle 45 and wall 42 at a level close to that of the weir 52, the flow rates involved would necessarily have to be extremely slow in order to provide sufficient time for particles to either float to the top or precipitate to the bottom before reaching weir 52. Furthermore, the annular baffle 45 and moving, cylindrical, shear creating wall 56 will be somewhat expensive to manufacture and maintain.

The U.S. patent issued to Moll et al., on Oct. 27, 1981, U.S. Pat. No. 4,297,221, and entitled "Process and Apparatus for the Treatment of Untreated Water" discloses a cylindrical sedimentation tank with an annular perforated baffle spaced concentrically inward from the outer wall of the tank. Water, treated with some kind of flocculating agent, is introduced tangentially into the cylindrical tank through port 5. The circular flow of the water is slowed down by the annular baffle so that the flocculating agent has time to collect particles together so that they precipitate to the bottom of the tank. The cleaner water is drawn off from the top of the tank through centrally located pipe 7. Although this device works fine for turbid water into which flocculating agents have been inserted, larger particles may clog up the perforated baffle 3. In addition, circumferential baffles of this nature are somewhat difficult to construct and therefore make the end product fairly expensive.

SUMMARY OF THE INVENTION

The present invention overcomes the above-mentioned disadvantages and provides a number of additional advantages not found in the any of the previous devices. These advantages include an open three chamber design to avoid any chance of clogging, a structure and principle of operation which permits a compact size, a design which enables the precipitator to be used in combination with a media filter such that the backwash cycle can be run directly through the precipitator and a low pressure differential across the precipitator which saves on energy and maintenance.

One aspect of the invention includes a cylindrical tank having two annular baffles therein separating the tank into three chambers. Fluid to be treated enters the lower chamber of the cylindrical tank at a tangent to the wall of the tank. The velocity of the fluid is slowed down during its residence in the lower chamber and during this period some of the particles will precipitate out to the bottom of the chamber. The lower annular-shaped baffle has an opening in the middle thereof which permits the water to eventually circulate up to the center chamber after its residence period in the lower chamber. The water then circulates around the outer edge of the upper annular-shaped baffle and then into the opening of a centrally located collection pipe which acts to collect cleaner water from the upper portions of the precipitator.

In another aspect of the invention, the untreated fluid inlet pipe is located just below the lowest baffle and above a point three quarters of the distance from the bottom of the lower chamber to the lower baffle in order to be sure that the incoming water does not disturb the sediment which is expected to accumulate at the bottom of the cylindrical tank. In another aspect of the invention the cross-sectional area of the inlet pipe is equal to the area of the opening between the lower chamber and the middle chamber as well as the opening between the middle chamber and the upper chamber. Additionally, in some cases, all of the above areas may be equal to the cross-sectional area of the central collection pipe. This acts to provide for even flow from the raw water inlet pipe to the exit of the precipitator while at the same time permitting maximum residence time in the lower and middle chambers to promote the maximum possible precipitation.

In another aspect of the invention, a cylindrical precipitator is mounted directly on top of a media filter to provide a very efficient, compact and energy-saving filter system. The precipitator can be retro-fitted to fit on an existing media filter or it can be manufactured initially in one piece with the media filter. In another aspect of the invention the cylindrical precipitator mounted on top of the media filter has no narrow restrictions therein and thus is suitable to be used directly in the backwash cycle of a normal media filter. In another aspect of the invention, the precipitation can be combined with any of a wide variety of other filters including screen filters.

Thus, the applicant has provided a new and improved particle precipitator which is simple and inexpensive to construct, includes no moving parts and thus, reduces maintenance expenses, stands upright and is of a compact size, works well under low velocity conditions and thus, does not need the larger and higher energy-consuming pumps necessary to drive some particle separators, and has an open interior baffle design so that little or no clogging occurs. In addition, the applicant has discovered a filtration system including a cylindrical particle precipitator mounted conveniently on top of a regular media filter tank which can add substantially to the length of time between backwashes and in addition can be set up such that the precipitator is included directly in the backwash circuit.

BRIEF DESCRIPTION OF THE DRAWINGS

FIG. 1 shows a particle precipitator mounted on top of a media filter;

FIG. 2 shows schematically how the precipitator/media filter combination can be arranged in a parallel filtration system;

FIG. 3 shows the particle precipitator by itself;

FIG. 4 shows the particle precipitator retro-fit onto the top of a media filter.

DETAILED DESCRIPTION OF THE INVENTION

Referring now to the drawings wherein like numerals indicate like parts, a filtration system 10 is shown in FIG. 1 which includes a media filter 12 and a particle precipitator 14 mounted thereon. The media filter, per se, is of a well-known construction and includes a cylindrical tank 16 closed at each end with convex heads 18,20. There is an opening 22 in the middle of the bottom head 18 which accepts an outlet pipe 24 for conducting water that has been filtered to a location where it is intended to be used. A collector 26 is located just inside the media filter tank 16 and consists of a screen which is designed to prevent the filter media 28 from escaping into the outlet pipe 24. The filter media 28 itself can be a wide variety of materials depending on the type of filtration that is desired. In this case we see a filtration media that consists of a lower layer of gravel with an upper layer, that fills nearly the entire media filter tank, of a finer sand.

Affixed to the top head of the media filter is a cylindrical particle precipitator 14. The particle precipitator itself is a cylindrical tank 32 having a top plate 34 and an open bottom. The media filter 12 and particle precipitator 14 can be connected in any well-known way including by means of welding along the edge of the open bottom of the cylindrical tank 32. It can be seen that after the two are connected the top 20 of the media filter forms the bottom of the precipitator tank 32. The volume of the tank is divided up into three chambers, a lower chamber 36, a middle chamber 38 and a top chamber 40 by two horizontally extending annular-shaped baffles 42,44. The lower annular baffle 42 has an opening 46 in its center and the outer edge 48 of the baffle has a diameter approximately equal to the inside diameter of the precipitator tank 32 so that the baffle fits snugly in a horizontal position in the tank. Although the lower baffle 42 may be positioned in a number of locations and still be effective, the preferred location is approximately half-way up the height of the cylindrical tank 32.

The upper annular baffle 44 is also mounted horizontally and sits at a position about three-quarters of the way up the height of the tank. A pipe 50 for drawing water from out of the top of the precipitator tank is positioned centrally and at its lower end opens up directly into the media filter 12. Its upper end supports the upper baffle 44. The upper baffle has a flat, annular shape with a hole 52 in the middle for permitting water to enter the central pipe 50. The outer diameter of the baffle 44 is smaller than the inner diameter of the precipitator tank 32 so that water may flow through the annular opening 56 created thereby into the upper chamber 40 and then into the outlet pipe 50. The upper baffle 44 is preferably flush with the top opening of the outlet pipe 50. However, this baffle 44 may be positioned somewhat lower than the top of the pipe 50 while still maintaining effectiveness of the precipitator.

The areas of openings 46 and 56 are preferably sized such that the flow rate into the lower chamber 36 through to the upper chamber 40 and out outlet pipe in 50 is the same. In particular, it is preferred that the areas of openings 46 and 56 be the same and equal to both areas of the interior cross sectional area of the inlet pipe 54 and the outlet pipe 50. Although the baffles 42 and 44 are shown with flow openings 46 and 56, other designs are contemplated including baffles having a plurality of distributed flow openings. Flow could also be regulated by providing any well-known means for changing the size of the openings.

An inlet pipe 54 for raw water is mounted on the side of the particle precipitator 14 such that the water enters the lower chamber. While the angle of entry is preferably horizontal and at a tangent to the surface, any angle that promotes circulation of the raw water in the lower chamber will suffice. The inlet pipe 54 is positioned just below the lower baffle 42 and above a point three quarters of the distance from the bottom plate 30 to the lower baffle 42 so that the water is introduced initially into the lower chamber 36. The concept is that the water will immediately reduce its velocity upon entering the chamber and circulate in a spiral around the tank making at least one full revolution before eventually migrating towards the center thereof. During the residence time of the water in this lower chamber the larger particles in the raw water will have an opportunity to precipitate out to the floor 30 of the precipitator tank 14. Periodically this material can be removed through a clean-out port 58 having valve 60 which is located at the bottom of the cylindrical tank 14 on the side wall thereof. During operation, the flow of the water will be into the lower chamber, circulating in the lower chamber up to the annular space 46 between the inner circular opening of the lower baffle and the center outlet pipe 50, around the edge of the upper baffle 44, into the upper chamber 40 and then into the opening 52 of the output pipe 50. The upper baffle prevents any current from forming which would suck fluids directly up from the lower chamber 36 through to the opening 52 of the output pipe 50.

During this process some particles may be deposited on the surfaces of the baffles 42,44. However, generally such particles will not interfere with the flow of the water and will be cleared out during the backwash phase to be described below. However, should it be desirable to clear these particles off at an earlier stage, an additional clean-out port (not shown in the drawings) for each of the two annular baffles 42,44 can be added during the manufacture of the particle precipitator. Furthermore, if desired, the shape of the baffles can be altered somewhat to encourage any particles that happen to fall thereon to eventually flow to the bottom of the cylindrical tank. Thus, it may be desirable under some circumstances to form the upper baffle in a partial cone shape such that the narrower portion of the cone is toward the top and to form the lower baffle in a partial cone shape with the narrower portion of the cone pointing downward. The conical-shaped baffles may also help in controlling the flow of water such that no currents are created which would act to move fluid from the inlet pipe up to the outlet pipe before it has had a chance to sit in the lower chamber and permit precipitation of particles.

During use it is often the case that air becomes entrained into the raw water which is being treated. In order to siphon off air such as this from the system it is desirable to in some cases include an air vent (not shown in the drawings) at the top of the particle precipitator tank.

FIG. 3 shows substantially the same particle precipitator 14 described with respect to FIG. 1 as a separate unit. The only difference being that a bottom plate 30 is added as the top 20 of filter tank 12 can no longer serve as the bottom of the precipitator tank. For some uses all that need be done is to precipitate out the larger particles before the raw water or fluid is usable. In such cases the particle precipitator may be used by itself. Thus, the raw water flows through the inlet pipe 54 into the cylindrical tank 32 through the lower chamber, the middle chamber and the upper chamber and out through the center outlet pipe 50.

Turning to FIG. 4 it can be seen that the particle precipitator could be retro-fitted to existing media filters and for that matter to any filter, including screen filters wherein a primary particle precipitator could be used to increase the period of effectiveness of the filter system. Thus, a retro-fit system is shown in FIG. 4, wherein the particle precipitator 14 has been connected between the media filter and the inlet line 54 for the raw water. Legs 62 have been schematically shown to support the particle precipitator 14 on top of the media filter 12. However, any suitable means of support is understood to be contemplated. Pipe connection 64 between the outlet of the precipitation tank and the inlet of the tank filter can be made using any well-known pressure-pipe connector.

FIG. 2 schematically shows an example of how a filter system, using the media filter/particle precipitator combination could be formed. Two sets of precipitator and media filter combination 66,66' are shown in parallel. The raw water flows into the upper pipe through the three-way back wash valves 70,70' and into the particle precipitators 14,14'. After some of the particles have precipitated out, the water then flows from the particle precipitators 14,14' down into the media filters 12,12' where additional undesirable material is removed from the fluid. The fluid then flows through the outlet port 50,50' of each of the media filters and finally through the outlet valve 72.

It is well-known in the filter art that after a filter has been used for some time and the undesirable material has built up in the filter, the filter system looses its effectiveness. At some stage in order to restore the filter system to its peak filtration level, filters such as these must be backwashed. The three-way valves 70,70' are generally referred to as backwash valves and the backwashing process runs as follows. Initially, the first media filter backwash valve 70 will be switched so that no raw water may enter and water from the valve will flow out the backwash line 74 in the direction of the dashed arrow. The second backwash valve 74' remains in the filtration position and the final outlet valve 72 is closed. Water from the second filter is then forced back into the first media filter 12 (see dashed arrows) through the media 28 itself up into the precipitator 14 and then out through the backwash valve 70 and backwash port 74. The flow of liquid in this direction is such that while undesirable particles trapped in the media will be washed therefrom, the media itself will not be sucked out through the backwash port. After the first filter is completely backwashed, the valve arrangement is switched so that the backwash valve of the first filter 70 is turned back to the filtration mode. This means that water may not escape through the backwash port and must go through the filter. The second backwash valve 70' is switched so that raw water cannot enter the precipitator and water may be forced back through the second backwash port 74'. Then a process similar to the process that occurred with the first filter happens in the second one until the undesirable material is removed from the media and from the precipitator. After both of the filters have been backwashed the output valve 72 remains closed for a short period of time and the rinse port valve 76 is opened so that raw water may be flowed through both filters and out through rinse port 78. This acts to clear the collector portion of the filter system of loose material and also rinses the connecting lines. The rinse valve 76 is then closed and the output valve 72 is opened and the two filters 66,66' are ready to use again.

Although the relationship between the size of the precipitator and the media filter can vary widely, it has been found to be most effective and efficient to have the diameter of the precipitator tank be approximately one-third that of the media filter tank.

Although this particle precipitator has been described particularly in connection with a media filter, it is understood that the particle precipitator itself may be used alone or in connection with any other filtering device including a screen filter.

Thus, applicant has provided a compact, low-cost, low-velocity, low-pressure drop and highly effective particle precipitator. In addition, the applicant has disclosed a unique, compact combination of a particle precipitator with a media filter which substantially increases the period of effective filtration while adding very little additional maintenance problems or space requirements.

What is claimed is:

1. A method comprising:
    providing a vertically positioned cylindrical tank having a central axis, said cylindrical tank being separated into upper, middle and lower sub-chambers by two baffles, each baffle having an annular opening;
    introducing fluid to be filtered into the lowest of said sub-chambers of said vertically positioned cylindrical tank;
    circulating said fluid within said tank, below said upper sub-chamber, in a direction generally concentric with the interior surface of said cylindrical tank;
    maintaining said fluid below said uppermost sub-chamber for at least one complete rotation about the central axis of the tank permitting undesirable particles to precipitate to the bottom of the tank;
    passing fluid through the annular openings in the baffles; and
    removing relatively cleaner fluid from said uppermost sub-chamber by way of a conduit.

2. The method of claim 1 wherein said fluid is circulated in a spiral beginning at the interior surface of said cylindrical tank and moving towards the central axis thereof.

3. A filtration system comprising:
    a tank filter comprising a container having a top portion with means defining an opening for introducing fluid to be filtered and a bottom portion having means defining an opening for removing filtered fluid;
    a particle precipitator having a cylindrical tank, said cylindrical tank having an upper closed end and a lower closed end, the interior of said cylindrical tank being divided up into three chambers, a lower chamber, a middle chamber and an upper chamber;
    said cylindrical tank having a lower and an upper baffle, said lower baffle separating said lower chamber from said middle chamber and said upper baffle separating said middle chamber from said upper chamber, said lower baffle having an outer circular edge attached to the inner surface of said cylindrical tank, said outer edge having a diameter approximately equal to the inner diameter of said cylindrical tank, said lower baffle further defining an opening in its center, said upper baffle having an outer circular edge with a diameter less than that of the inner surface of said cylindrical tank to provide an annular passage between said outer edge and said inner surface, each of said baffles permitting restricted flow between said chambers;
    means defining an inlet port mounted on said cylindrical tank for admitting raw water to be filtered, said inlet port being mounted tangentially to the surface of said cylindrical tank at a point just below said lower baffle so that fluid to be filtered enters at an angle and circulates in the lower chamber for a period before flowing up through said baffles to said upper chamber; and
    an outlet pipe mounted in said cylindrical tank, said outlet pipe providing fluid communication only between said upper chamber and said opening at the top portion of said tank filter, so that fluid is drawn off only from said upper chamber.

4. The filtration system of claim 3 wherein said outlet pipe is centrally located within said cylindrical tank and exits through the bottom of said cylindrical tank and said lower end of said cylindrical tank being mounted directly to said upper portion of said tank filter such that said outlet pipe feeds directly into said opening for introducing fluid to said tank filter.

5. Apparatus comprising:
a container defining a cylindrical cavity therein, said cavity having upper and lower closed ends;
a first baffle mounted in said cylindrical cavity;
a second baffle mounted in said cylindrical cavity above said first baffle;
said first baffle forming a first opening permitting the passage of fluid within said cylindrical cavity from below said first baffle to above said first baffle, said second baffle forming a second opening permitting the passage of fluid within said cylindrical cavity from below said second baffle to above said second baffle, said first and second openings being annular openings concentric with the interior surface of said cylindrical cavity, said openings being out of vertical alignment with each other such that fluid cannot short circuit by flowing vertically directly from a point below said first baffle to a point above said second baffle;
an inlet pipe mounted below said first baffle on the side wall of the container defining said cylindrical cavity at an angle to said side wall such that fluid within said cylindrical cavity will circulate in a manner generally concentric with the walls of the container defining said cylindrical cavity; and
means defining an outlet providing fluid communication only from above said second baffle to the exterior of said cylindrical cavity.

6. Apparatus comprising:
means defining a cylindrical chamber having lower, middle and upper cylindrical sub-chambers;
means for introducing fluid into said lower sub-chamber at an angle to the interior surface of the cylindrical chamber which promotes circulation of the fluid along paths generally concentric with the interior cylindrical surface of said chamber;
means for restricting fluid flow between said lower sub-chamber and said middle sub-chamber and between said middle sub-chamber and said upper sub-chamber comprising:
a. a first annular baffle positioned between said lower and middle chambers which has an outer diameter substantially equal to the inner diameter of said cylindrical chamber, said first baffle being mounted to the wall of said cylindrical chamber and defining an opening in its center to permit fluid to flow from said lower chamber to said middle chamber;
b. a second annular baffle positioned between said middle and upper chambers which has an outer circular edge, the outer diameter of said second baffle being somewhat less than the diameter of the inner surface of said cylindrical chamber, said second baffle being mounted such that an annular opening for fluid flow is formed between the outer edge of said second baffle and the inner surface of said cylindrical chamber;
means for removing fluid from said cylindrical chamber comprising:
an outlet pipe centrally located in said cylindrical chamber which opens into said upper sub-chamber and exits said cylindrical chamber at the bottom thereof, said second baffle being mounted on and concentric with said outlet pipe, said pipe projecting through said central opening in said first baffle so that an annular flow area is created between the outer surface of said outlet pipe and the inner edge of said first baffle, said outlet pipe acting to draw fluid only from said upper sub-chamber.

7. The apparatus of claim 6 wherein said means for introducing fluid comprises means for introducing the fluid at a tangent to the interior surface of said cylindrical lower sub-chamber.

8. The apparatus of claim 6 wherein said flow restricting means includes means for maintaining the flow rate between said lower sub-chamber and said middle sub-chamber and between said middle sub-chamber and said upper sub-chamber at substantially the same rate that fluid is introduced to said lower sub-chamber.

9. The apparatus of claim 6 wherein said flow restricting means has areas through which fluid may flow and which areas are substantially equal.

10. The apparatus of claim 9 wherein said areas of flow are also substantially equal to the cross-sectional area of said fluid introducing means and said fluid removing means.

11. The apparatus of claim 10 wherein said means for introducing fluid is a conduit having a cross-sectional area substantially equal to said areas of flow.

12. The apparatus of claim 11 wherein said outlet pipe has a cross-sectional area substantially equal to said areas of flow.

13. The apparatus of claim 12 wherein said baffles are substantially flat and arranged horizontally within said cylindrical chamber.

14. The apparatus of claim 6 wherein said means for introducing fluid is a conduit which opens into said lower sub-chamber at a point within the top one quarter of said lower sub-chamber.

15. The apparatus of claim 6 further comprising a tank filter having two ends, a first end having means for admitting fluid to be filtered and a second end having means for releasing filtered fluid; and
said upper sub-chamber removing means being connected to said tank filter fluid admitting means.

16. The apparatus of claim 15 wherein said tank filter is a screen filter.

17. The apparatus of claim 15 wherein said tank filter is a media filter having a cylindrical tank with said first end being a top end and said second end being a bottom end and wherein said means defining a cylindrical chamber is mounted on the top end of said media filter.

18. The apparatus of claim 17 wherein the lower end of said cylindrical chamber is formed by a central portion of the top end of said media filter.

* * * * *